United States Patent
Seifert

(10) Patent No.: US 7,310,042 B2
(45) Date of Patent: Dec. 18, 2007

(54) SYSTEM AND METHOD FOR BIOMETRIC-BASED FRAUD PROTECTION

(76) Inventor: Mark K. Seifert, 107 Saint Brides Ct., Cary, NC (US) 27511

( * ) Notice: Subject to any disclaimer, the term of this patent is extended or adjusted under 35 U.S.C. 154(b) by 167 days.

(21) Appl. No.: 10/499,461

(22) PCT Filed: Dec. 19, 2002

(86) PCT No.: PCT/US02/40759

§ 371 (c)(1),
(2), (4) Date: Jun. 18, 2004

(87) PCT Pub. No.: WO03/054806

PCT Pub. Date: Jul. 3, 2003

(65) Prior Publication Data

US 2005/0225430 A1    Oct. 13, 2005

Related U.S. Application Data

(60) Provisional application No. 60/342,278, filed on Dec. 19, 2001.

(51) Int. Cl.
H04Q 9/00 (2006.01)

(52) U.S. Cl. .................. 340/5.53; 340/5.82; 340/5.83

(58) Field of Classification Search ............... 340/5.53, 340/5.82, 5.83
See application file for complete search history.

(56) References Cited

U.S. PATENT DOCUMENTS

| | | | |
|---|---|---|---|
| 4,085,313 A | 4/1978 | Van Ness | 235/381 |
| 4,614,861 A | 9/1986 | Pavlov | 235/380 |
| 4,720,860 A | 1/1988 | Weiss | 713/184 |
| 4,993,068 A | 2/1991 | Piosenka | 713/186 |
| 5,053,608 A * | 10/1991 | Senanayake | 340/5.83 |
| 5,180,901 A * | 1/1993 | Hiramatsu | 340/5.83 |
| 5,280,527 A | 1/1994 | Gullman et al. | 713/184 |
| 5,317,636 A | 5/1994 | Vizcaino | 705/65 |
| 5,448,044 A | 9/1995 | Price et al. | |
| 5,465,290 A | 11/1995 | Hampton et al. | |
| 5,623,552 A | 4/1997 | Lane | |
| 5,806,040 A | 9/1998 | Vensko | |
| 5,897,616 A | 4/1999 | Kanevsky et al. | |
| 5,920,642 A | 7/1999 | Merjanian | |
| 6,016,476 A | 1/2000 | Maes et al. | |
| 6,084,967 A | 7/2000 | Kennedy et al. | |
| 6,119,096 A | 9/2000 | Mann et al. | |
| 6,208,264 B1 * | 3/2001 | Bradney et al. | 382/115 |
| 6,213,391 B1 | 4/2001 | Lewis | |
| 6,213,403 B1 * | 4/2001 | Bates, III | 235/492 |
| 6,325,285 B1 * | 12/2001 | Baratelli | 235/380 |
| 6,547,130 B1 | 4/2003 | Shen | 235/380 |
| 2002/0035542 A1 * | 3/2002 | Tumey et al. | 340/5.83 |
| 2002/0070844 A1 | 6/2002 | Davida et al. | |

* cited by examiner

Primary Examiner—Jeffery Hofsass
Assistant Examiner—Scott Au
(74) Attorney, Agent, or Firm—Triangle Patents, PLLC

(57) ABSTRACT

A biometric fingerprint device for preventing fraud based on the device having standalone, self-authentication of the identity of predetermined user(s) and its interactivity with a database that is initiated via a controlled singularity of registration, i.e. contemporaneous registration of a user's fingerprint(s) into a database and registration, initialization, and authentication of that same fingerprint(s) onto a standalone biometric fingerprint device.

20 Claims, 1 Drawing Sheet

SYSTEM AND METHOD FOR BIOMETRIC-BASED FRAUD PROTECTION

CROSS-REFERENCE TO RELATED U.S. PROVISIONAL PATENT APPLICATIONS

This application is a 371 of PCT/US02/40759 Dec. 19, 2002 claims the benefit of U.S. Provisional Application No. 60/342,278, filed in the United States Patent and Trademark Office on Dec. 19, 2001, the entirety of application is incorporated herein by reference.

BACKGROUND OF THE INVENTION (1) Field of the Invention

The present invention relates generally to biometric identification devices and, more particularly, to a biometric fingerprint device for preventing fraud based on the device having standalone, self-authentication of the identity of predetermined user(s) and its interactivity with a database that is initiated via a controlled singularity of registration.

(2) Description of the Prior Art

Prior art biometric devices commonly employ fingerprint identification and verification as a means for protecting the use of the device for proximity pass, apparatus activation, and access to information. Furthermore, it is known in the prior art to use portable information and transaction processing devices (PITP devices). These devices can be used to perform secure financial transactions, to allow the user access to another apparatus, or to transmit information for various personal reasons. To perform these functions, these devices are able to store data internally and transmit data, including personal user data, over communication lines. PITP devices may also employ biometric verification to ensure the identity of the user. In these devices, biometric verification may include finger, thumb, palm, and voice print, handwriting sample, retinal vascular pattern, and combinations thereof. Additionally, these devices have been constructed to include card readers that read information storage cards. Also, these devices can encrypt information and transmit it via dual-tone multi-frequency, modem, radio frequency, and infrared media. However, none of these devices is a standalone device, in that they require an external central data storage and processing unit to verify the identity of the PITP device user. Additionally, because the data is stored on a central data storage unit, the security of these devices and information relating to their users may be eventually compromised. In such a case, unauthorized use of the PITP device may occur, allowing unauthorized transactions. A single device has overcome this deficiency by incorporating the storage means of the biometric information within the PITP device. Thus, the device is freestanding and will not emit a signal unless the appropriate user is using the device. However, this device does not also emit tonal signals to confirm authentication of the user via biometric identification means. Therefore, there remains a need for a self-authenticating biometric identification device that can be used in connection with an encoded packet output, e.g., a digitized tonal output also having capacity to be used with portable information and transaction processing devices. Particularly where privacy is a significant concern, it is advantageous to provide a biometric device within which the individual fingerprint and other data or information is stored, i.e., there is no requirement for transmitting the fingerprint itself to a remote confirmation bank or source that stores the registered information against which the sensed fingerprint is verified.

Furthermore, there is a need to provide protection from fraudulent use of identification, including counterfeit identification, in particular for security applications, government benefits receipt, exclusivity applications, and the like. The identification cards of the prior art do not provide means for preventing fraud or counterfeit IDs. Also, the prior art, including the U.S. Pat. No. 5,623,552 issued Apr. 22, 1997 to Lane for SELF-AUTHENTICATING IDENTIFICATION CARD WITH FINGERPRINT IDENTIFICATION, either do not communicate with a database to prevent fraud by multiple registrations for any given user, or the ID cards require communication with a database for any and all transactions for which the card is used.

More particularly, the following U.S. patent citations provide a basis for establishing the prior art relevant to the present invention:

U.S. Pat. No. 6,016,476 issued Jan. 18, 2000 to Maes, et al. for Portable information and transaction processing system and method utilizing biometric authorization and digital certificate security. This patent teaches a portable client PDA with touch screen, microphone, and CPU for processing voice commands, and processing biometric data to verify user. Also it has memory for storing personal/financial data, and capability for reading/writing information to various smart cards, magnetic cards, etc.

U.S. Pat. No. 6,084,967 issued Jul. 4, 2000 to Kennedy, et al. for Radio telecommunication device and method of authenticating a user with a voice authentication token. The user must insert a PIN and utter sounds; the radiotelephone device will activate secure functions only if PIN is correct and uttered sounds are authenticated against stored voice feature information.

U.S. Pat. No. 5,465,290 issued Nov. 7, 1995 to Hampton, et al. for Confirming identity of telephone caller. Data stored in a processing station corresponds to a signature and caller identification information for users. A second processing station includes speaker verification unit and processor, which receives voice or tone signal representing signature of potential user and processes this. Processor is connected to speaker verification unit and connects to first processing station to test the signature of user against valid signature of user.

U.S. Pat. No. 5,897,616 issued Apr. 27, 1999 to Kanevsky, et al. for Apparatus and methods for speaker. Provides verification/identification/classification employing non-acoustic and/or acoustic models and databases. Secure method and apparatus for access to service facility employing voice recognition; based on personal information an individual is questioned, a voice sample is obtained and verified. A score is generated based in comparison to spoken answer and voice sample, and access is granted if score is at or above a threshold. Alternatively, a series of questions could be asked and potential matches to the speaker are eliminated after comparison of voice/response analysis.

U.S. Pat. No. 5,806,040 issued Sep. 8, 1998 to Vensko for Speech controlled telephone credit card verification system. The system connects user to phone network, user enters a card number, a voice verification template is retrieved and contains samples of user's voice stating selected words/phrases/numbers. The user is prompted to state one of these and comparison is made. User is authorized if match is made.

None of the previously issued patents cited in the foregoing provide a biometric device having internal memory and internal controller means while also providing a tonal output and database interactivity for authorizing transactions from the device via modem communication means.

Thus, there remains a need for a biometric identification device, specifically a self-authenticating, biometric fingerprint identification device having internal memory and internal controller, an encoded or encrypted information packet output, e.g., a digitized tonal output, and a unique transaction identifier, wherein the self-authenticating ID card interacts with a database that is initiated via a controlled singularity of registration all of which are provided in the present invention.

SUMMARY OF THE INVENTION

The present invention is directed to a biometric fingerprint device for self-authenticating identification of at least one user of the device including internal memory and controller means within a substrate of the device and encoded packet(s) of information output, e.g., a digitized tonal output, for communicating with a remote transaction facilitator, wherein the self-authenticating ID card interacts with a database that is initiated via a controlled singularity of registration.

In particular, applications include both open and closed databases, for the purpose of identifying one user from many and eliminating the possibility of duplicate registration, e.g., for high security, military, government services and benefits receipts, passports/visas, drivers licenses, etc.

Additionally, the present invention is directed to a biometric device for self-authenticating identification of at least one user via a biometric identification input by the user, which may be information relating to at least one fingerprint, voice, etc., including a unique transaction identifier for increased security, particularly with retail transactions made via phone, wireless device, Internet, satellite, or other communication means, after the initial singularity of registration of the user for the card and with the database; as such, transactions do not require communication with the database after the initial contemporaneous registration process is completed.

Accordingly, one aspect of the present invention is to provide a biometric fingerprint device for self-authenticating identification of at least one user of the device including internal memory and controller means within a substrate of the device and an encoded or encrypted information packet output, e.g., a digitized tonal output, for communicating with a remote database after a singularity of registration of the user for the card and with the database occurs.

Another aspect of the present invention is to provide a biometric fingerprint device for self-authenticating identification of at least one user including transaction functions that provide for approval or denial of card use and automatic database communication with the card for updating the card after initial registration, including but not limited to updating, invalidating, timer synchronizing, and the like.

These and other aspects of the present invention will become apparent to those skilled in the art after a reading of the following description of the preferred embodiment.

DETAILED DESCRIPTION OF THE PREFERRED EMBODIMENTS

Figure 1:
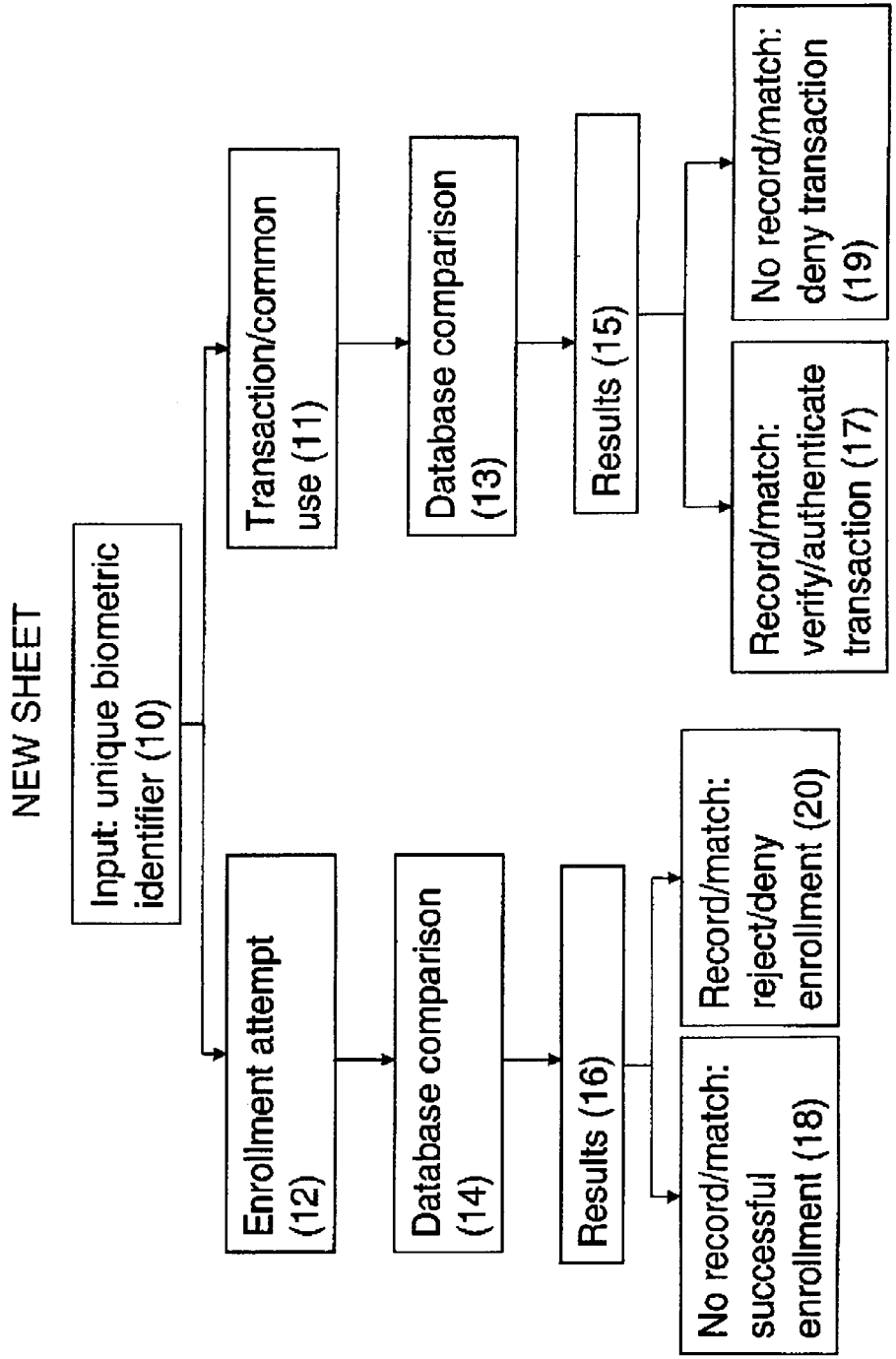
FIG. 1 is a flow diagram of methods according to the present invention.

According to the present invention, a biometric device is provided for self-authenticating identification of at least one user. Basic functions and configurations of the biometric device are set forth by U.S. Pat. No. 5,623,552 issued Apr. 22, 1997 to Lane for Self-authenticating identification card with fingerprint identification and co-pending U.S. Pat. No. 09/780,637 by Lane filed Feb. 08, 2001 which are both owned by a common assignee and are each incorporated herein by reference in their entirety. Referring now to FIG. 1, a flow diagram illustrating steps within methods according to the present invention is shown. In a method of using an identification system, steps include providing an identification card having a substrate including an internal memory device and an internal control device in electronic communication for providing activation of the card for use by an authorized user; inputting a biometric identifier input corresponding to the user via a biometric input device that communicates with the internal memory device and the internal control device for providing the biometric identifier input (10); transmitting the biometric identifier input to a database stored on a remote computer (11, 12); validating the biometric identifier input and/or the user by confirming the existence of a match to the biometric identifier that corresponds to the user that is stored in the database on the remote computer (13, 14); receiving a validation response from the database by the card, while the card is in communication with the database for the transmission of the biometric identifier input and receipt of the validation response (15, 16); confirming a singular, unique existence of the biometric identifier input and/or the user in the database (17); denying the transaction and/or the authentication where more than a singular unique registration exists in the database for the biometric identification input and/or the user (19, 20); and where the card has never been authenticated and/or activated previously, confirming registration of the biometric identifier and corresponding user in the database (18).

The device includes a substrate having a fingerprint sensor, internal memory means for storing digitized information related to a fingerprint of the at least one user, activation means for initiating internal storage of the information related to at least one fingerprint corresponding to the at least one user upon activation by the at least one user for a first time thereby creating and recording at least one registered user, an internal controller, verification means for indicating that the information related to the at least one fingerprint corresponding to the at least one registered user has been successfully stored in the internal memory means, and authentication means for comparing information related to a sensed fingerprint corresponding to the at least one user that has been sensed with the stored fingerprint information of the registered user and for producing an authentication signal if the sensed fingerprint information matches the stored fingerprint information of the at least one registered user.

The fingerprint sensor is capable of sensing information related to at least one fingerprint and the sensed fingerprint is either used to register a new user, if multiple users are permitted for the particular device, or is used to verify that the information relating to the sensed fingerprint matches the information of the fingerprint of each of the registered users. In the case where more than one user may be registered for a device, each user has corresponding fingerprint identification information that is unique to that user and registered similarly.

The internal memory device is in communication with the biometric identification input device. In one embodiment, the internal memory device is electrically connected to a fingerprint sensor, to verification means, to authentication means, and to activation means, which are all configured to be in communication with the internal memory of the card. Also, the internal controller is capable of independently programming the internal memory means with the information related to a fingerprint corresponding to the at least one user by generating an internal control signal to initiate transfer of the information related to the sensed fingerprint corresponding to the at least one user to the internal memory means for storage therein.

Additionally, the verification means and/or authentication means further includes a transmitter for indicating that the information related to a fingerprint has been successfully stored to create the at least one registered user. This verification and/or authentication signal includes an encoded or encrypted information packet output for verification and/or for authentication that the biometric identification input, which may be information relating to at least one fingerprint of the user, the voice of the user, and the like, matches that of the at least one registered user that is transmitted or communicated via an encoded information packet output transmitter located within the biometric device substrate. The output from the device may be converted into an encoded or encrypted information packet that is output by a transmitter located within the device.

According to a preferred embodiment of the present invention, the biometric device also includes a database for receiving initial registration information about each of the at least one user of the system, wherein the database and card registration or initial activation are performed substantially contemporaneously, thereby ensuring that no duplicate identifications are created in the system. Duplicate checking may occur for each new registration to ensure that, for a given user, there is not already a preexisting registration in the system. Preferably, this duplicate checking is performed using fingerprint information from the user, which may include at least one digit fingerprint, a multiplicity of digits fingerprints, or fingerprints from all hand digits of the user. These fingerprints are checked from the fingerprints registered by all users of the system as recorded in the database. This permits the user to be identified as one unique user out of the many users within the system, or even those outside the system, which are not yet registered for the purpose of permitting use of a self-authenticated card for transactions without requiring communication for each transaction with the database.

Preferably, the present invention provides for an identification system for authenticating a user wherein the system includes an identification card having a substrate including an internal memory device and an internal control device in electronic communication for providing activation of the card for use by an authorized user, wherein the user inputs a biometric identifier input via a biometric input device that communicates with the internal memory device and the internal control device for providing the biometric identifier input, the biometric identifier input is validated and authenticated upon transmission of the biometric identifier input to a database stored on a remote computer and receipt of a validation response from the database, wherein the card is in communication with the database for the transmission of the biometric identifier input and receipt of the validation response, and wherein the database confirms the singular, unique existence of a match to the biometric identifier input that corresponds to the user, wherein the match is stored in the database. Preferably, the biometric identifier input corresponds to at least one fingerprint of the user, which is recorded and authenticated on the card by initially inputting information corresponding to the at least one fingerprint of the user into the substrate, which may be accomplished by an initial scanning, swiping, or otherwise registering it by a sensor, reader, or other device for inputting the information into the card memory. The card then communicates the information corresponding to the at least one fingerprint of the user, which is stored on the card, to the database for validation and confirmation that no duplicate identification exists at that time in the database, i.e., that no match corresponds to the user and/or to the biometric identification input by the user, thereby preventing duplicate registrations within the database for either the user and/or for the biometric identification information input to the card by the user.

The biometric identifier input is then transmitted to the database. The transmission may be provided by data packet transmission, digital transmission, and/or tonal transmission representing the biometric identifier input, which may include information relating to at least one fingerprint of the user, voice of the user, and the like, and combinations thereof.

In a preferred embodiment of the present invention, the card provides for freestanding identification of the user, i.e., once the user and/or the user's corresponding biometric identifier input is registered in the database, the card will activate on its own, without requiring communication with the database, for confirming the identification of the user and the user's biometric identification input, with that biometric identification input initially provided and registered on the card and validated by the database. Advantageously, this system provides for the singular, unique existence of the match in the database for preventing duplicate identifications for the biometric identifier input as well as providing a card that may not be activated by anyone except the user providing his/her unique biometric identification input, which was initially input upon registration of the card with the database. Thus, the singular, unique existence of the match in the database prevents duplicate identifications for the user within the database, while the registration of the biometric identification input for the predetermined, authorized user of the card is stored in the freestanding memory of the card, as well as in the database, such that the card may not be activated without authentication and/or validation of the user and/or the user's biometric identification input properly and confirmed on the card. As such, the system provides for a controlled singularity of registration for the user and/or the biometric identification input corresponding to the user is provided by an essentially simultaneous registration of the card and of the user and/or the biometric identification input into the database through the card as set forth hereinabove.

Preferably, to ensure security, the registration of the user and the user's corresponding biometric identification input to the card and to the database is made in person by the user at a designated computer in communication with the remote computer of the database. Furthermore, the registration may be made with a confirming assistant, such as an authorized person and/or a video capture of the user making the registration.

Once the user has initially registered his/her biometric identification input to the card and the database, and that registration is confirmed by the database as having a singular match, with no duplication of the user and/or the biometric identification input, a transaction is authorizable by the system, i.e., the database will permit the card user to perform a transaction, such as a purchase, an information query, authorization for entry or access to a computer system(s) or physical location, health care and/or other services approval, insurance filing, pharmaceutical prescription pick-up, and the like.

Importantly, any business, economic, or other transaction that is made by the user follows validation of the user and the biometric identification input by the database or another database that is in communication with the first database, or without any communication to a database, but where the card itself provides authorization based upon authentication of the present card holder as the predetermined authorized card user with his/her corresponding biometric identification input being stored on the card and validated within a predetermined time period on the database prior to the transaction. This validation of the user by the database needs to occur at least one time prior to any transaction being completed, but may occur more than one time, e.g., randomly or at predetermined times, to prevent fraudulent use of the device in a transaction.

In a preferred embodiment of the system, a charge may be assessed to the user for accessing the database, wherein the charge is stored in the internal memory device of the card and/or the database. In this manner, a database management fee may be assessed so that the system may be maintained and/or upgraded.

The present invention may be used either for a closed system having a multiplicity of users, i.e., where membership is the basis for registration, e.g., benefits receipt, healthcare access, insurance, welfare, security clearance, CIA, FBI, secret services, military, country clubs, and the like, where the database will include members and exclude access to non-members, or for an open system having a multiplicity of users, e.g., credit card use at a point of merchant transaction, drivers licenses, national identification cards, passports, visas, immigration and border control, etc.

Significantly, the freestanding or standalone card having self-authenticating fingerprint identification activation is initialized contemporaneously with the fingerprint entry into the database; this provides for an essentially simultaneous registration of the card user's fingerprint with the card and with the database, which serves to prevent fraud by counterfeiting cards or by attempts to register duplicate cards per any given user. This controlled singularity of registration may be accomplished using the fingerprint of at least one digit of the user, or a multiplicity of digits, or all digits of the user. This contemporaneous registration is preferably conducted in person and assistance is provided by a database authorized official, whereby additional bio-identifiers and/or documentation confirming an individual user's identity are required at the time of registration.

A variety of transaction functions are permitted by the card when the user has successfully activated the card after the initial registration, including but not limited to transaction functions that provide for approval or denial of card use and automatic database communication with the card for updating the card after initial registration, including but not limited to updating, invalidating, timer synchronizing, and the like. The approval for card use occurs where the user's fingerprint(s) are registered in the system database as well as on the card itself; the card may be in communication with the database automatically and/or at use points of the card to confirm the registration of the fingerprint(s) on the card matches that within the system, that the fingerprint(s) appear only once in the database, and that the fingerprint(s) are associated with the person identified on the card; when these factors are satisfied, then the card is activated for use, and may so indicate via a visual and/or audible indicator(s).

Use of the device according to the present invention may be a source of revenue, i.e., a charge or fee may be assessed against the card issuer for each use of the card, and/or for each query to the database for a given card. Given the benefits of use of the card for any given transaction, whether that be credit card use for a purchase, membership confirmation, proximity access, welfare benefits use, services use by a provider, etc., a fee may be associated with that transaction such that usage of the cards that are confirmed in the database at their initial registration, since the fraud prevention provides a much greater savings. In this manner, the fee-per-transaction provides a revenue-generation means that funds the operation and maintenance of the database.

The present invention is further directed to a method for using the identification system set forth in the foregoing comprising the steps of:

providing an identification card having a substrate including an internal memory device and an internal control device in electronic communication for providing activation of the card for use by an authorized user;

inputting a biometric identifier input corresponding to the user via a biometric input device that communicates with the internal memory device and the internal control device for providing the biometric identifier input;

transmitting the biometric identifier input to a database stored on a remote computer;

validating the biometric identifier input and/or the user by confirming the existence of a match to the biometric identifier input that corresponds to the user that is stored in the database on the remote computer;

receiving a validation response from the database by the card, while the card is in communication with the database for the transmission of the biometric identifier input and receipt of the validation response;

confirming a singular, unique existence of the biometric identifier input and/or the user in the database;

and, where the card has never been authenticated and/or activated previously, confirming registration of the biometric identifier and corresponding user in the database.

Furthermore, the method may include the step of authorizing a transaction for the card based upon the confirmation, where the card had previously been authenticated and/or activated previously. Also, an additional or alternative step of denying a transaction and/or the authentication where more than a singular unique registration exists in the database for the biometric identification input and/or the user is included in the method according to the present invention.

Certain modifications and improvements will occur to those skilled in the art upon a reading of the foregoing description. By way of example, the substrate may be substantially compact such that it can be used as or within a smart card, or credit card sized device, including a magnetic swipe to be loaded with or containing additional information about the registered user. Alternatively, the substrate may be a larger embodiment, e.g., a computer circuit board. Another alternative, or additional, security measure relating to the biometric identification input includes onboard voice authentication by means of an integral microphone and onboard voice pattern storage and onboard control and recognition and database interactivity for assured voice authentication and singularity of registration. All modifications and improvements have been deleted herein for the sake of conciseness and readability but are properly within the scope of the claims.

I claim:

1. An identification system for authenticating a user comprising:

an identification card having a substrate including a biometric input device, an internal memory device, and an internal control device in electronic communication for providing self-activation of the identification card for use by an authorized user, wherein the user inputs a biometric identifier input via a biometric input device that communicates with the internal memory device and the internal control device for providing the biometric identifier input, wherein a database stored on a remote computer is provided for receiving initial registration and optionally for subsequent checks of validity and singularity of the biometric information stored on the identification card and within the database relating to the authorized user, the biometric identifier input is initially validated upon transmission of the biometric identifier input to the database stored on a remote computer and receipt of a validation response from the database, wherein the identification card is initially in communication with the database for transmission of the biometric identifier input and receipt of the validation response for initial registration, and wherein the database confirms the singular, unique existence of a match to the biometric identifier input that corresponds to the user, wherein after initial registration with the database the identification card is independently self-activated for authorizing a transaction, permitting but without requiring communication with the database for confirming the biometric identifier input of the user, wherein the transaction and/or the authentication is denied where more than a singular unique registration exists in the database for the biometric identification input and/or the user, and wherein the match is stored in the database.

2. The system according to claim 1, wherein the biometric identifier input corresponds to at least one fingerprint of the user.

3. The system according to claim 1, wherein the transmission of the biometric identifier input is provided by data packet transmission.

4. The system according to claim 1, wherein the transmission includes tonal transmission representing the biometric identifier input.

5. The system according to claim 1, wherein the identification card provides for freestanding identification of the user.

6. The system according to claim 1, wherein the singular, unique existence of the match in the database prevents duplicate identifications for the biometric identifier input.

7. The system according to claim 1, wherein the singular, unique existence of the match in the database prevents duplicate identification for the user.

8. The system according to claim 1, wherein the database includes a closed system of a multiplicity of users.

9. The system according to claim 8, wherein the closed system is based upon a membership that excludes non-members.

10. The system according to claim 1, wherein the database includes an open system of a multiplicity of users.

11. The system according to claim 1, further including a controlled singularity of registration for the user and/or the biometric identification input corresponding to the user is provided by an essentially simultaneous initial registration of the card and of the user and/or the biometric identification input into the database.

12. The system according to claim 11, wherein the initial registration is made in person by the user at a designated computer in communication with the remote computer of the database.

13. The system according to claim 12, wherein the registration is made with a confirming assistant.

14. The system according to claim 13, further including a charge that is assessed to the user for accessing the database, the charge being stored in the internal memory device of the card and/or the database.

15. The system according to claim 1, wherein an authentication signal is produced if the biometric identification input of the user matches the biometric identification input stored on the identification card.

16. The system according to claim 1, wherein the transaction that is made by the user follows initial registration and validation of the user and the biometric identification input by the database.

17. The system according to claim 1, comprising automatic database communication with the card for updating the card after initial registration.

18. A method for using an identification system comprising the steps of:

providing an identification card having a substrate including a biometric input device, an internal memory device, and an internal control device in electronic communication for providing self-activation of the identification card for use by an authorized user;

inputting a biometric identifier input corresponding to the user via the biometric input device that communicates with the internal memory device and the internal control device for providing the biometric identifier input;

transmitting the biometric identifier input to a database stored on a remote computer for receiving initial registration and optionally for subsequent checks of validity and singularity of biometric information relating to the authorized user stored on the identification card and in the database;

initially validating the biometric identifier input and/or the user by confirming the existence of a match to the biometric identifier input that corresponds to the user that is stored in the database on the remote computer;

receiving a validation response for initial registration from the database by the identification card while the identification card is in communication with the database for the transmission of the biometric identifier input and receipt of the initial registration validation response;

confirming a singular, unique existence of the biometric identifier input corresponding to the user on the card and in the database during initial registration;

self-activating the identification card after initial registration with the database for authorizing a transaction without requiring communication with the database for confirming the biometric identifier input of the user;

denying the transaction and/or the authentication where more tan a singular unique registration exists in the database for the biometric identification input and/or the user.

19. The method according to claim 18, further including a transaction wherein an authentication signal is produced if the biometric identification input of the user matches the biometric identification input stored on the identification card.

20. The method according to claim 18, further including the step of authorizing the transaction for the card based upon the confirmation, where the card user's biometric identifier input has not previously been registered.

* * * * *